United States Patent
Bommarito et al.

(10) Patent No.: US 12,544,472 B2
(45) Date of Patent: Feb. 10, 2026

(54) MULTILAYER TEST PACK FOR STERILIZATION MONITORING

(71) Applicant: Solventum Intellectual Properties Company, Maplewood, MN (US)

(72) Inventors: G. Marco Bommarito, Stillwater, MN (US); Timothy J. Nies, Stillwater, MN (US); Paul N. Holt, St. Paul, MN (US)

(73) Assignee: Solventum Intellectual Properties Company, Maplewood, MN (US)

( * ) Notice: Subject to any disclaimer, the term of this patent is extended or adjusted under 35 U.S.C. 154(b) by 1088 days.

(21) Appl. No.: 17/309,613

(22) PCT Filed: Dec. 26, 2019

(86) PCT No.: PCT/IB2019/061376
§ 371 (c)(1),
(2) Date: Jun. 10, 2021

(87) PCT Pub. No.: WO2020/136602
PCT Pub. Date: Jul. 2, 2020

(65) Prior Publication Data
US 2022/0054693 A1 Feb. 24, 2022

Related U.S. Application Data

(60) Provisional application No. 62/785,380, filed on Dec. 27, 2018.

(51) Int. Cl.
*B32B 3/00* (2006.01)
*A61L 2/28* (2006.01)
*B01L 3/00* (2006.01)
*B32B 3/26* (2006.01)
*B32B 3/28* (2006.01)
*B32B 3/30* (2006.01)
(Continued)

(52) U.S. Cl.
CPC ............ *A61L 2/28* (2013.01); *B32B 3/266* (2013.01); *B32B 3/28* (2013.01); *B32B 3/30* (2013.01);
(Continued)

(58) Field of Classification Search
CPC .................. B32B 3/266; A61L 2/28
See application file for complete search history.

(56) References Cited

U.S. PATENT DOCUMENTS 5,204,062 A 4/1993 Buglino
5,217,901 A * 6/1993 Dyckman ............... A61L 2/28
435/31

(Continued)

FOREIGN PATENT DOCUMENTS

DE 2952750 7/1981
WO WO 2001-56618 8/2001
(Continued)

OTHER PUBLICATIONS

International Search Report for PCT International Application No. PCT/IB2019/061376, mailed on Apr. 17, 2020, 4 pages.

*Primary Examiner* — Nathan A Bowers

(57) ABSTRACT

The disclosed multilayer test pack comprises a channel lamina to form a recessed channel, and then a seal layer covers the recessed channel to form an embedded channel. By providing the recessed channel in a thin-film channel lamina, the recessed channel tolerances are better controlled. Further, using thin films for the channel lamina, which can be formed into a roll, allows for a continuous unrolling and continuous bonding to a seal layer.

20 Claims, 4 Drawing Sheets

(51) Int. Cl.
    *B32B 7/10*      (2006.01)
    *B32B 37/00*     (2006.01)
    *B32B 37/10*     (2006.01)
    *B32B 37/15*     (2006.01)
    *B32B 38/18*     (2006.01)

(52) U.S. Cl.
    CPC ............ *B32B 7/10* (2013.01); *B32B 37/0076* (2013.01); *B32B 37/10* (2013.01); *B32B 37/153* (2013.01); *B32B 38/18* (2013.01); *B32B 2250/02* (2013.01); *B32B 2250/03* (2013.01)

(56) References Cited

U.S. PATENT DOCUMENTS

| | | | |
|---|---|---|---|
| 5,922,591 A * | 7/1999 | Anderson | B01F 35/718 422/68.1 |
| 6,572,830 B1 * | 6/2003 | Burdon | B01J 19/0093 422/129 |
| 7,045,343 B2 | 5/2006 | Witcher | |
| 7,927,866 B2 | 4/2011 | Justi | |
| 9,017,944 B2 | 4/2015 | Foekens | |
| 2008/0261296 A1 | 10/2008 | Justi | |
| 2009/0028752 A1 | 1/2009 | Bala | |

FOREIGN PATENT DOCUMENTS

| | | |
|---|---|---|
| WO | WO 2002-11775 | 2/2002 |
| WO | 2013122852 A1 | 8/2013 |
| WO | 2016/164329 A1 | 10/2016 |
| WO | WO 2018-106860 | 6/2018 |

\* cited by examiner

MULTILAYER TEST PACK FOR STERILIZATION MONITORING

CROSS REFERENCE TO RELATED APPLICATIONS

This application is a national stage filing under 35 U.S.C. 371 of PCT/IB2019/061376, filed Dec. 26, 2019, which claims the benefit of U.S. Provisional Application No. 62/785,380, filed Dec. 27, 2018, the disclosure of which is incorporated by reference in its/their entirety herein.

TECHNICAL FIELD

The present disclosure relates to a multilayer test pack for sterilization monitoring, a method of making and a method of using the multilayer test pack.

BACKGROUND

In a sterilization process, sterilant gasses like steam, hydrogen peroxide, or ethylene oxide, are used to sterilize a load. For example, garments, tools, and instrument that are reused are placed in a sterilizer before reuse. Sterilization indicators are used to determine whether a sterilizing machine is functioning properly and killing microorganisms that maybe present in the sterilizer.

Biological indicators are used to gauge the effectiveness of the sterilization procedure by monitoring the survival of a test microorganism contained with the biological indicator that is many times more resistant to the sterilization process than most organisms. These biologic indicators are exposed to a sterilization cycle, then incubated under conditions that will promote the growth of any surviving test microorganisms. If the sterilization cycle fails, the biological indicator generates a detectable signal indicating that the biological specimen survived.

Chemical indicators can be read immediately at the end of the sterilization process. The results indicate only that a particular condition was present during the sterilization process, such as the presence of a particular chemical or a temperature for a certain period of time.

These sterilization indicators are often included in a test pack, which provide resistance for exposing the sterilant to the sterilization indicators contained within the test pack. U.S. Pat. No. 7,045,343 discloses a sterilization indicator test pack.

SUMMARY

Precisely forming a channel into a sterilization test pack will provide a definite amount of resistance for exposing sterilant to the sterilization indicators contained within the test pack. A thin film channel lamina is used to form a recessed channel, and then a seal layer covers the recessed channel to form an embedded channel By providing the recessed channel in a thin-film channel lamina, the recessed channel tolerances are better controlled. Further, using thin-films for the channel lamina, which can be formed into a roll, allows for a continuous unrolling and continuous bonding to a seal layer. Manufacturing can be continuous, fast and efficient.

In one embodiment, the multilayer test pack comprises a channel lamina comprising a channel surface, a covering surface opposite from the channel surface. The channel surface comprises a bonding surface, a recessed channel extending from the first bonding surface into the channel surface. The test pack further comprises a seal layer comprising a seal surface and an outer surface opposite from the seal surface, wherein the seal surface is bonded to the bonding surface. An embedded channel is contained between the recessed channel and the seal surface. The embedded channel extends from an inlet port exposed to an external environment and an outlet port exposed to a sealed cavity. The sealed cavity is separately connected with the channel lamina.

In one embodiment, the channel lamina comprises a single, unitary structure wherein the recessed channel extends partially into the channel surface. In one embodiment, the channel lamina comprises a first continuous layer comprising the channel surface and a second continuous layer comprising the covering surface. In one embodiment, the recessed channel extends entirely through the first layer. In one embodiment, the channel lamina is a thin layer with a substantially planar covering surface and substantially planar bonding surface. In one embodiment, the channel lamina further comprises an edge surrounding the channel surface and covering surface.

In one embodiment, the seal layer further comprises an edge surrounding the seal surface and outer surface. In one embodiment, the seal layer further comprises the sealed cavity.

In one embodiment, the inlet port is at the edge of the channel lamina, at the covering surface, or is at the seal layer. In one embodiment, the outlet port is at the channel surface or at the seal layer.

In one embodiment, the sealed cavity holds at least one of a biological indicator or a chemical indicator.

In one embodiment, the seal surface is bonded to the bonding surface by thermal bonding or adhesive bonding.

In one embodiment, a method of making a multilayer test pack comprises providing a channel lamina. The channel lamina comprising a channel surface, a covering surface opposite from the channel surface, wherein the channel surface comprises a bonding surface and a recessed channel extending from the first bonding surface into the channel surface. The method further comprises providing a seal layer comprising a seal surface and an outer surface opposite from the seal surface and bonding the seal surface to the bonding surface to form an embedded channel between the recessed channel and the seal surface.

In one embodiment of the method, the embedded channel extends from an inlet port exposed to an external environment and an outlet port exposed to a sealed cavity. In one embodiment of the method, the sealed cavity is separately connected with the channel lamina. In on embodiment of the method, bonding is thermal bonding or adhesive bonding. In one embodiment of the method, the channel lamina comprises a single, unitary structure, further comprising microreplicating the recessed channel into the channel surface. In one embodiment of the method, the channel lamina comprises a first continuous layer comprising the channel surface and a second continuous layer comprising the covering surface, further comprising bonding the first continuous layer to the second continuous layer.

In one embodiment of the method, the channel lamina is provided on a roll and the seal layer is provided on a roll, further comprising unrolling the channel lamina, unrolling the seal layer, continuously bonding the seal surface to the bonding surface.

BRIEF DESCRIPTION OF DRAWINGS

FIG. 1b is a top view of the embodiment of the multilayer test pack of FIG. 1a;

FIG. 1c is a side sectional assembled view of the embodiment of the multilayer test pack of FIG. 1a;

FIG. 2b is a top view of the embodiment of the multilayer test pack of FIG. 2a;

FIG. 2c is a side sectional assembled view of the embodiment of the multilayer test pack of FIG. 2a;

FIG. 3b is a top view of the embodiment of the multilayer test pack of FIG. 3a;

FIG. 3c is a side sectional assembled view of the embodiment of the multilayer test pack of FIG. 3a;

While the above-identified drawings and figures set forth embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of this invention. The figures may not be drawn to scale.

DETAILED DESCRIPTION

Precisely forming a channel into a sterilization test pack will provide a definite amount of resistance for exposing sterilant to the sterilization indicators contained within the test pack. A thin-film channel lamina is used to form a recessed channel, and then a seal layer covers the recessed channel to form an embedded channel By providing the recessed channel in a thin film channel lamina, the recessed channel tolerances are better controlled. As will be described below, microreplication processes can be used, which have extremely controlled manufacturing tolerances or in embodiments where the channel lamina is a multilayer structure, the recessed channel can be entirely cut through a film layer forming the recessed channel. Further, using thin films for the channel lamina, which can be formed into a roll, allows for a continuous unrolling and continuous bonding to a seal layer. Therefore, manufacturing can be continuous, fast and efficient.

Prior test packs, such as shown in U.S. Pat. Nos. 7,927,866 and 9,017,944 typically used thermoforming processing to create all of the structured surfaces, the channel as well as the sealed cavity, in a single layer. Given the large difference in size between the channel and the sealed cavity, wide variation in forming the channel can occur. Further, thermoforming or injection molding can be a slow, batch manufacturing process where parts are made one-by-one.

The disclosed multilayer test pack comprises a channel lamina, a seal layer, which combine to form an embedded channel. The sealed cavity for holding the sterilization indicator is separately connected with the channel lamina.

Figure 1A:
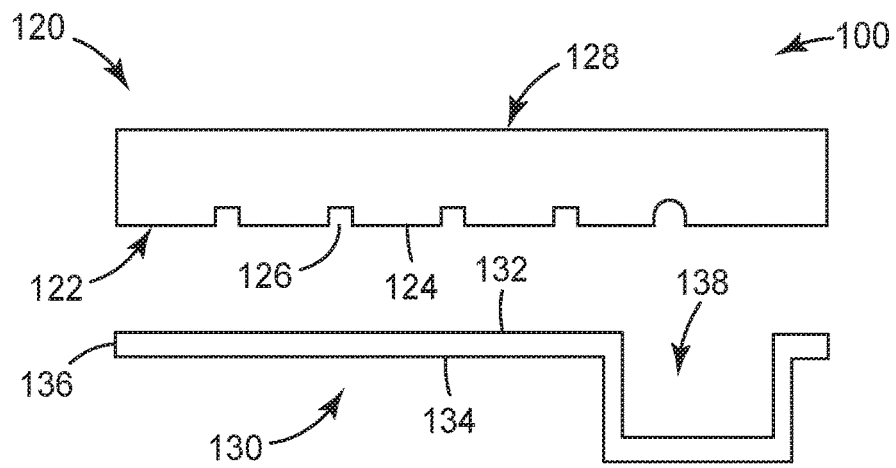
FIG. 1a is a side sectional, exploded view of one embodiment of a multilayer test pack, where the channel lamina is a single layer.
Figure 1B:
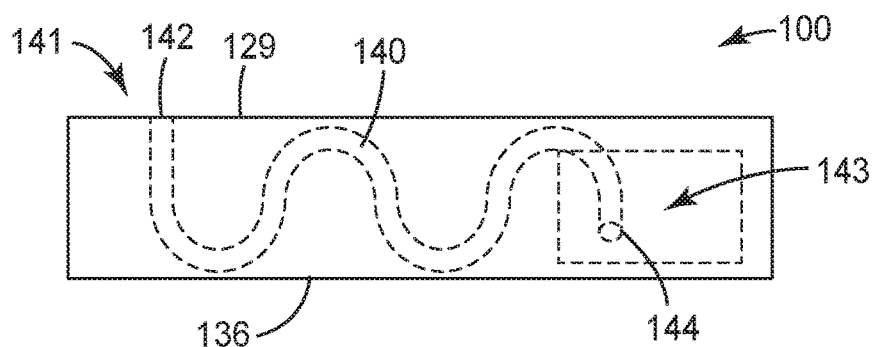
Figure 1C:
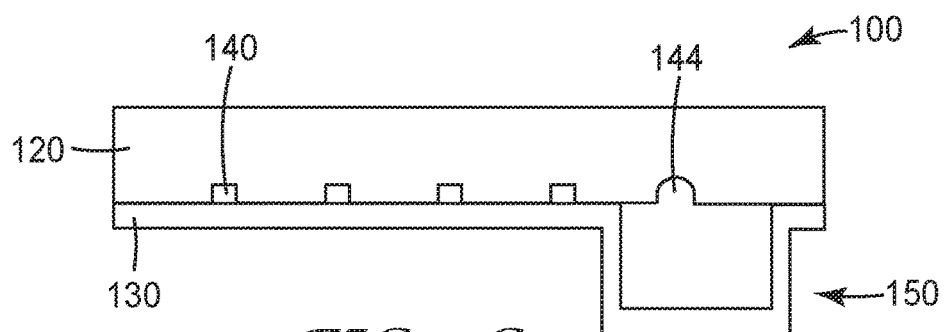

FIGS. 1a, 1b, and 1c depict an embodiment of a multilayer test pack 100. FIG. 1a is a side sectional, exploded view of the multilayer test pack 100, where the channel lamina 120 is a single layer. FIG. 1b is a top view of the multilayer test pack 100. FIG. 1c is a side sectional assembled view of the multilayer test pack 100.

The multilayer test pack 100 has a channel lamina 120, a seal layer 130, and a sealed cavity 150. In an assembled form, such as shown in FIGS. 1b and 1c, the channel lamina 120 and seal layer 130 interface to form a embedded channel 140.

Channel lamina 120 is a generally planar sheet comprising channel surface 122, covering surface 128, and an edge 129. The channel lamina 120 is generally much longer and wider than it is thick. Channel surface 122 comprises bonding surface 124 and recessed channel 126. In this embodiment, the recessed channel 126 extends partially into the channel lamina 120. In this embodiment, recessed channel 126 does not extend completely through channel lamina 120. In one embodiment, recessed channel 126 extends no greater than 10%, no greater than 25%, no greater than 50%, no greater than 75%, no greater than 90% into a thickness of channel lamina 120. Precise control of the dimensions (length, depth, and diameter) of recess channel 126 is important for obtaining a reliable test pack. High precision can be achieved using a method such as microreplication for manufacturing the channel lamina 120 such as shown in FIG. 1a when the channel lamina 120 is a single layer construction with a channel surface 122.

Seal layer 130 has a seal surface 132, an outer surface 134, and an edge 136. Seal layer 130 is generally planar and in this embodiment further comprises recess 138. Recess 138 is a space that can hold one or more indicators. Indicators include chemical indicators and biological indicators.

As shown in FIG. 1c, seal layer 130 is fixed to the bonding surface 124 of channel lamina 120. Methods of fixing seal layer 130 to channel lamina 120 can include, but is not limited to, such techniques as, ultrasonic welding, solvent welding, an adhesive, hot melt bonding, thermal bonding/lamination and combinations thereof. Recessed channel 126 forms the embedded channel 140 when seal layer 130 is fixed to channel lamina 120. Embedded channel 140 has first end 141 and second end 143 (exemplified in FIG. 1b). In this embodiment, first end 141 is at the edge 129 of the channel lamina 120 and forms an inlet port 142 that is open to the environment. Second end 143 comprises outlet port 144 that is open to sealed cavity 150. The dimensions of the embedded channel 140 can be any number of sizes, shapes, or lengths to provide sufficient challenge to the external sterilant reaching an indicator within the sealed cavity 150.

Sealed cavity 150 is formed from the recess 138 sealed to the channel lamina 120. The sealed cavity 150 can receive one or more indicators, such as chemical or biological indicators. As shown in this embodiment, the sealed cavity 150 is integral with the seal layer 130. The sealed cavity 150, in the assembled construction such as shown in FIG. 1c is sealed from the external environments except through the outlet port 144 from the embedded channel 140. As can be seen, generally, the sealed cavity 150 is much larger in size than the embedded channel 140.

Chanel lamina 120 and seal layer 130 can be formed from materials that are able to bond together and can withstand the sterilization process. For example, the materials could be thermoplastic material, including, but not limited to, propylene, polyethylene, polystyrene, and polyvinyl chloride.

Figure 2A:
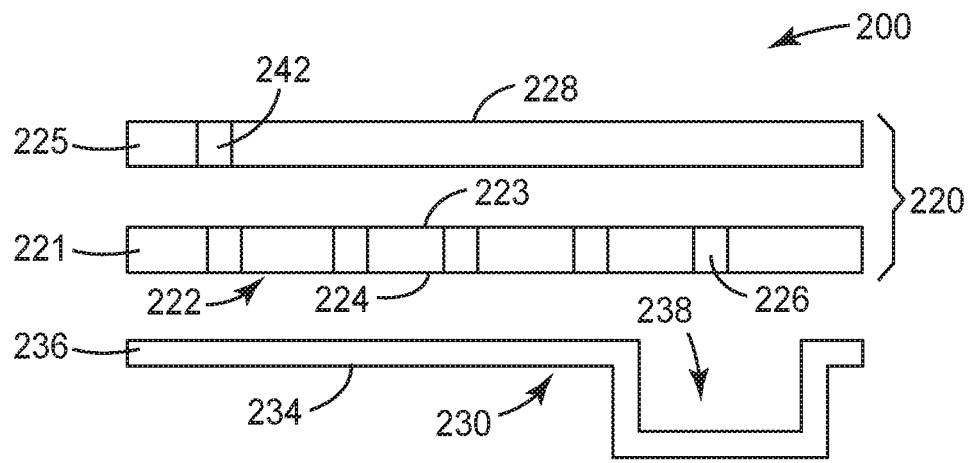
FIG. 2a is a side sectional, exploded view of a second embodiment of a multilayer test pack, where the channel lamina comprises two layers.
Figure 2B:
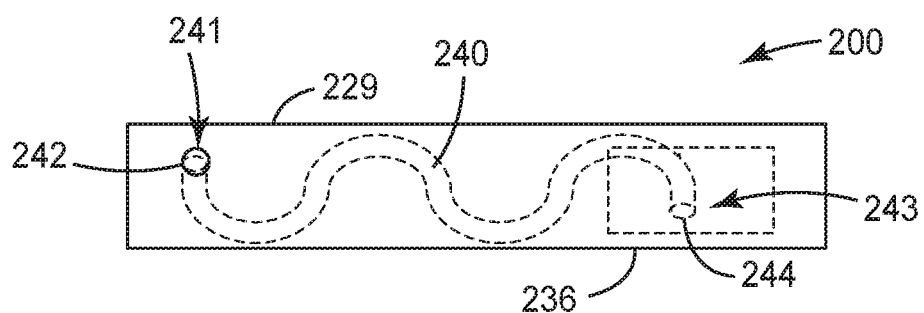
Figure 2C:
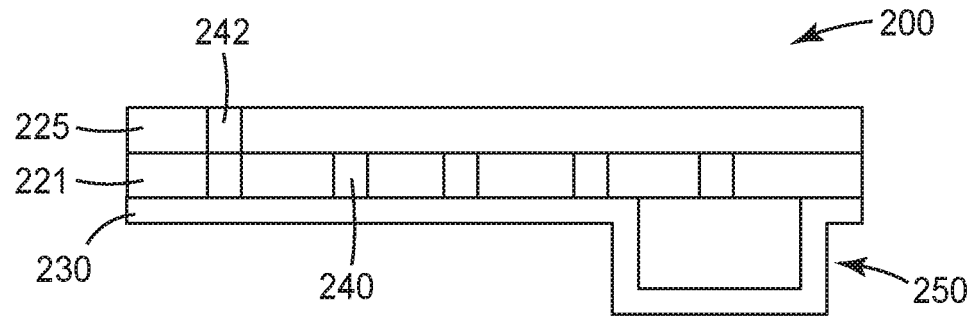

FIGS. 2a, 2b, and 2c depict another embodiment of a multilayer test pack 200. FIG. 2a is a side sectional, exploded view of the multilayer test pack 200, where the channel lamina 220 comprises two layers. FIG. 2b is a top view of the multilayer test pack 200. FIG. 2c is a side sectional assembled view of the multilayer test pack 200.

The multilayer test pack 200 has a channel lamina 220, which comprises a channel layer 221 and a surface layer 225, a seal layer 230, and a sealed cavity 250. In an assembled form, the channel lamina 220 and seal layer 230 interface to form a sealed channel 240.

Channel lamina 220 comprises channel layer 221, surface layer 225, surrounded by an edge 229. Channel layer 221 comprises top surface 223 and channel surface 222 Channel surface 222 comprises bonding surface 224 and recessed channel 226. The recessed channel 226 extends through the entire thickness of channel layer 221. Top surface 223 of channel layer 221 is fixed to surface layer 225. Precise control of the depth of the recess channel 226 is achieved because control of the thickness of the channel layer 221 will define the thickness for the recessed channel 226.

Seal layer 230 has a seal surface 232, an outer surface 234, and edges 236. Seal layer 230 is generally planar and further comprises recess 238. Recess 238 is a space that can hold one or more indicators, such as chemical indicators and biological indicators.

FIG. 2c shown as assembled view. Seal layer 230 is fixed to channel lamina 220 at the interface of bonding surface 224 with seal surface 232. Methods of fixing seal layer 230 to channel lamina 220 can include, but is not limited to, ultrasonic welding, solvent welding, an adhesive, hot melt bonding, thermal bonding/lamination, and combinations thereof. Recessed channel 226 forms the embedded channel 240 when seal layer 230 is fixed to channel lamina 220, and in this embodiment, which the surface layer 225 is placed on the channel layer 221. Embedded channel 240 has first end 241 and second end 243. First end 241 comprises inlet port 242 that is open to the environment and second end 243 comprises outlet port 244 that is open to sealed cavity 250. In this embodiment, the inlet port 244 is within the channel layer 221 of the channel lamina 220. The dimensions of the embedded channel 240 can be any number of sizes, shapes, or lengths to provide sufficient challenge to the external sterilant reaching an indicator within the sealed cavity 250.

Sealed cavity 250 is formed from the recess 238 sealed to the channel lamina 220. The sealed cavity 250 can receive one or more indicators, such as chemical or biological indicators. As shown, the sealed cavity 250 is integral with the seal layer 230. The sealed cavity 250, in the assembled construction such as shown in FIG. 2c is sealed from the external environments except through the outlet port 244 from the embedded channel 240. As can be seen, generally, the sealed cavity 250 is much larger in size than the embedded channel 240.

Chanel lamina 220 and seal layer 230 can be formed from materials that are able to bond together and can withstand the sterilization process. For example, the materials could be thermoplastic material, including, but not limited to, propylene, polyethylene, polystyrene, and polyvinyl chloride.

Figure 3A:
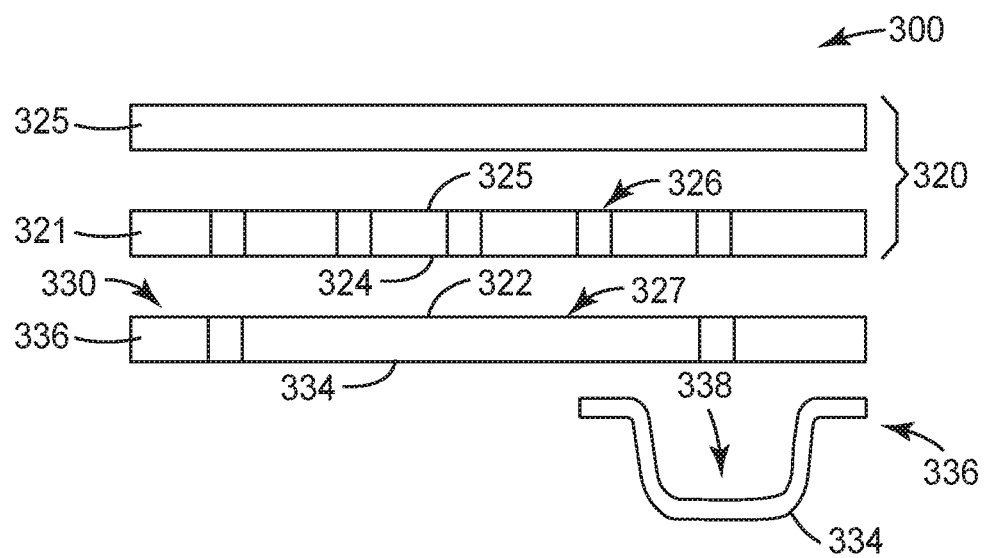
FIG. 3a is a side sectional, exploded view of a third embodiment of a multilayer test pack, where the channel lamina comprises two layers.
Figure 3B:
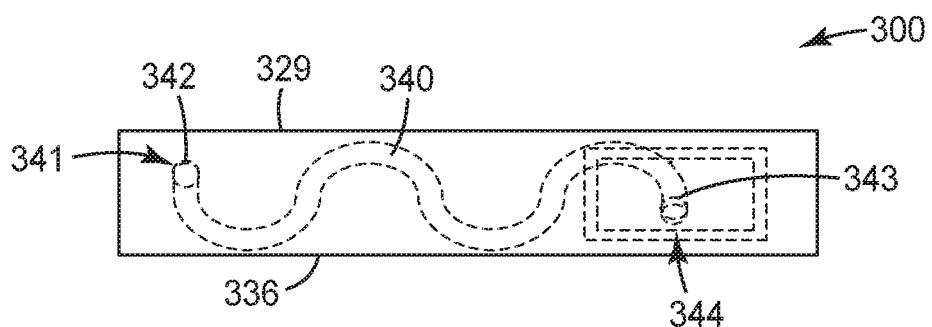
Figure 3C:
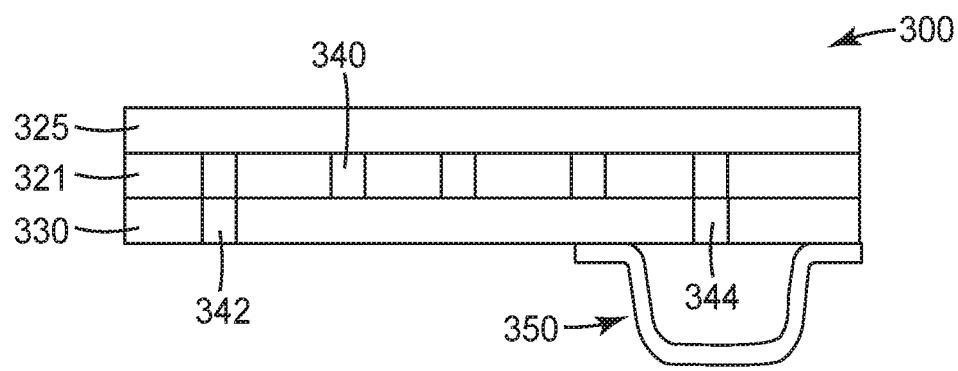

FIGS. 3a, 3b, and 3c depict another embodiment of a multilayer test pack 300. FIG. 3a is a side sectional, exploded view of the multilayer test pack 300, where the channel lamina 320 comprises two layers. FIG. 3b is a top view of the multilayer test pack 300. FIG. 3c is a side sectional assembled view of the multilayer test pack 300.

The multilayer test pack 300 has a channel lamina 320, which comprises a channel layer 321 and a surface layer 325, a seal layer 330, and a sealed cavity 350. When assembled, the channel lamina 320 and seal layer 330 interface to form a sealed channel 340. In this embodiment, sealed cavity 350 is not integrally formed with the seal layer 330 but is instead separately connected with the seal layer 330.

Channel lamina 320 comprises channel layer 321, surface layer 325, surrounded by edge 329. Similar to the construction described in FIG. 2a, channel layer 321 comprises top surface 323 and channel surface 322. Channel surface 322 comprises bonding surface 324 and recessed channel 326. Recessed channel 326 extends through the entire thickness of channel layer 321. Surface layer 325 is a solid, continuously extending surface, with no through-holes.

Seal layer 330 has a seal surface 332, an outer surface 334, and an edge 336. Seal layer 330 is generally planar. As assembled, seal layer 330 is fixed to channel lamina 320 at the interface of bonding surface 324 with seal surface 332 with techniques such as as, ultrasonic welding, solvent welding, an adhesive, hot melt bonding, thermal bonding/lamination and combinations thereof. Recessed channel 326 forms the embedded channel 340 when seal layer 330 is fixed to channel lamina 320, and when the channel lamina 320 has surface layer 325 secured. Embedded channel 340 has first end 341 and second end 343 (exemplified in FIG. 3b). First end 341 is in the seal layer 330 and forms an inlet port 342 that is open to the environment. Second end 343 is also in the seal layer 330 and forms the outlet port 344 that is open to sealed cavity 350. The dimensions of the embedded channel can be any number of sizes, shapes, or lengths to provide sufficient challenge to the external sterilant reaching an indicator within the sealed cavity 350.

Sealed cavity 350 is formed from the recess 338 sealed to the seal layer 330. Sealed cavity 350 receives one or more indicators, such as chemical and biological indicators. As shown, the sealed cavity 350 is separately connected with the seal layer 330. In this embodiment, the sealed cavity 350 can be bonded or secured to the seal layer 330 through such techniques as ultrasonic welding, solvent welding, an adhesive, hot melt bonding, thermal bonding/lamination, or combination thereof. The sealed cavity 350, in the assembled construction such as shown in FIG. 3c is sealed from the external environments except through the outlet port 344 from the embedded channel 340. As can be seen, generally, the sealed cavity 350 is much larger in size than the embedded channel 340.

Chanel lamina 320, seal layer 330, and sealed cavity 350 can be formed from materials that are able to bond together and can withstand the sterilization process. For example, the materials could be thermoplastic material, including, but not limited to, propylene, polyethylene, polystyrene, and polyvinyl chloride. Any one of these layers may be of various thickness, flexibility, or rigidity.

Inserted into the sealed cavity 350 is at least one of a biologic indicator or a chemical indicator. Following a sterilization cycle, where the sterilant travels through the embedded channel to reach the sealed cavity, the indicators must be read. If the sealed cavity is constructed of a clear material, visual indication on the indicator can be perceived. However, typically biologic indicators will need to be removed from the sealed cavity and allowed to incubate. Following incubation then the biologic indicator is read. Therefore, the various layers of the disclosed test package should be constructed to allow access into the sealed cavity following sterilization. In one example, the adhesive or lamination of the sealed cavity is removable to allow access to the contained indicator in the sealed cavity.

Although the embodiments described a single embedded channel, it is understood that more than on embedded channel could be formed for providing access from the exterior environment to the sealed cavity.

It is understood that for any embodiment, the location of the inlet port can be interchangeably located in the edge of the channel lamina such as shown in FIG. 1a-1c or at an interior as shown in FIGS. 2a-2c and FIGS. 3a-3c.

It is understood that for any embodiment, the channel lamina maybe a single layer, like shown in FIG. 1a or a multilayer construction such as shown in FIGS. 2a and 3a. Further, additional layers could be included such a channel lamina with 3 or more layers.

It is understood that for any embodiment, the cavity can be integrally formed as part of the seal layer such as shown in FIGS. 1a and 2a or can be itself a separate element applied to the multilayer test pack such as shown in FIG. 3a.

An advantage of the test packs described herein is that the overall area of the test pack can be minimized because the embedded channel can extend over an area of the sealed cavity. Alternative designs where the channel and the cavity are integrally formed into the same material have the channel adjacent to the cavity and therefore the size of the test pack is larger. In an embodiment, the cavity can be located directly beneath the embedded channel.

Figure 4:
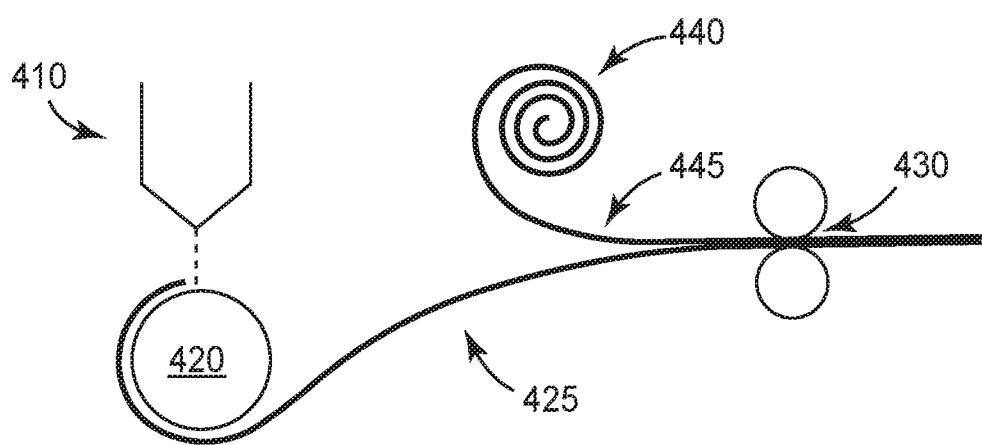
FIG. 4 is a side view of one embodiment of a method of making a multilayer test pack, using a microreplication process, and wherein the channel lamina and seal layer are bonded together.

FIG. 4 depicts an embodiment of a method of making a test pack such as the test pack 100 shown in FIGS. 1a-1c. The method of making test pack 100 comprises extrusion die 410, microreplication roll 420, nip 430, and seal layer roll 440. Extrusion die 410 extrudes material, such as thermoplastic material, onto microreplication roll 420 with a structured surface producing the structure of the channel lamina 425. The channel lamina 425 is then fed into nip 430 where it is fixed to the seal layer 445 from the seal layer roll 440. Further elements may be included depending on the technique used for connecting the channel lamina 425 to the seal layer 445. For example, adhesive coaters or sprayers maybe included.

Figure 5:
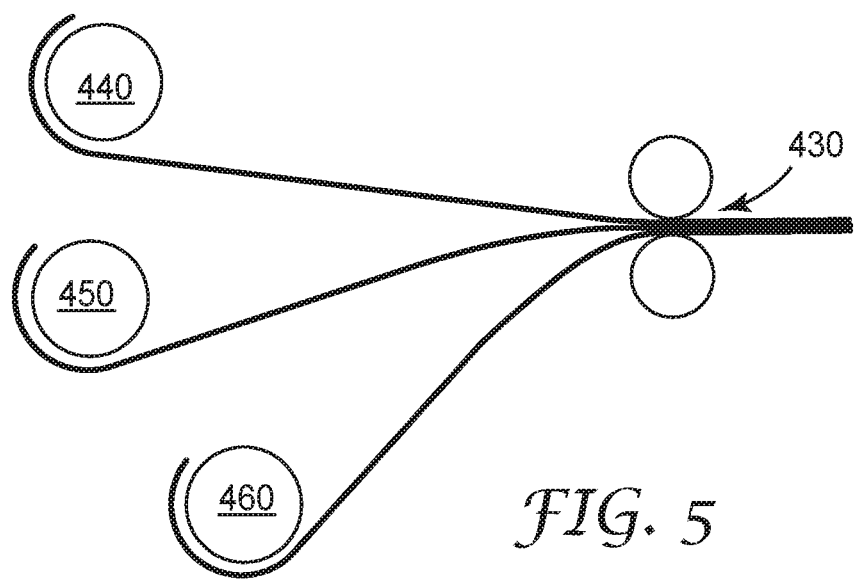
FIG. 5 is a side view of one embodiment of a method of making a multilayer test pack, wherein the channel lamina comprises a first layer and second layer, and wherein the first layer, second layer and seal layer are bonded together.

FIG. 5 depicts an embodiment of a method of making test pack such as a test pack 200, 300 shown in FIG. 2a-2c or 3a-3c. The method comprises seal layer roll 440, channel layer roll 450, and surface layer roll 460. The layers are fed from the respective rolls into nip 430, which fixes the layers together. Further, elements may be included depending on the technique used for connecting the channel lamina 425 to the seal layer 445. For example, adhesive coaters or sprayers maybe included.

A method of using the test pack can include subjecting the test pack containing one or more indicators to a decontamination process such as autoclaving along with the materials being decontaminated. The sterilant, such as steam, ethylene oxide, or hydrogen peroxide, travel from the external environment, through the embedder channel, and into the sealed cavity containing the indicators. A chemical indicator will indicate exposure to the sterilant. The sterilant will kill any of the biologic material within the biologic indicator. Following sterilization, the indicators can be removed. If used, a biologic indicator may be incubated to determine whether any remaining biologic matter will grow to indicate a "failed" sterilization cycle.

Although specific embodiments have been shown and described herein, it is understood that these embodiments are merely illustrative of the many possible specific arrangements that can be devised in application of the principles of the invention. Numerous and varied other arrangements can be devised in accordance with these principles by those of skill in the art without departing from the spirit and scope of the invention. The scope of the present invention should not be limited to the structures described in this application, but only by the structures described by the language of the claims and the equivalents of those structures.

What is claimed is:

1. A multilayer test pack for sterilization monitoring, the multilayer test pack comprising:
    a channel lamina configured to provide resistance for exposing a sterilant to a sterilization indicator contained within the multilayer test pack, the channel lamina comprising:
        a channel layer, comprising:
            a top surface;
            a bonding surface; and
            a recessed channel having a depth defined by an entire thickness of the channel layer and extending through the entire thickness of the channel layer, wherein the thickness of the channel layer extends from the bonding surface to the top surface; and
        a surface layer fixed to the top surface of the channel layer;
    a seal layer comprising a seal surface and an outer surface opposite from the seal surface, wherein the seal surface is bonded to the bonding surface; and
    a sealed cavity formed in a layer of the multilayer test pack other than the channel lamina, wherein the sealed cavity holds the sterilization indicator,
    wherein the recessed channel extends from an inlet port exposed to an external environment to an outlet port exposed to the sealed cavity.

2. The multilayer test pack of claim 1, wherein the channel lamina comprises a first continuous layer comprising the channel layer and a second continuous layer comprising the surface layer.

3. The multilayer test pack of claim 2, wherein the recessed channel extends entirely through the first continuous layer.

4. The multilayer test pack of claim 1, wherein the surface layer and the bonding surface are planar.

5. The multilayer test pack of claim 1, wherein the channel lamina further comprises an edge surrounding the channel layer and the surface layer.

6. The multilayer test pack of claim 1, wherein the seal layer further comprises an edge surrounding the seal surface and the outer surface.

7. The multilayer test pack of claim 1, wherein the seal layer further comprises the sealed cavity.

8. The multilayer test pack of claim 1, wherein the inlet port is located at an edge of the channel lamina, is located at the surface layer, or is at the seal layer.

9. The multilayer test pack of claim 1, wherein the outlet port is located at the channel layer or at the seal layer.

10. The multilayer test pack of claim 1, wherein the sealed cavity holds at least one of a biological indicator or a chemical indicator.

11. The multilayer test pack of claim 1, wherein the seal surface is bonded to the bonding surface by thermal bonding or adhesive bonding.

12. The multilayer test pack of claim 1, further comprising a biological indicator disposed in the sealed cavity.

13. The multilayer test pack of claim 1, wherein the sterilant comprises steam, ethylene oxide, or hydrogen peroxide.

14. The multilayer test pack of claim 1, wherein the recessed channel is configured to provide sufficient challenge to the sterilant reaching an indicator within the sealed cavity.

15. A method of making a multilayer test pack for sterilization monitoring, the method comprising:
providing a channel lamina configured to provide resistance for exposing a sterilant to a sterilization indicator contained within the multilayer test pack and comprising a channel layer and a surface layer fixed to the channel layer, wherein the channel layer comprises:
a top surface;
a bonding surface; and
a recessed channel having a depth defined by an entire thickness of the channel layer and extending through the entire thickness of the channel layer, wherein the thickness of the channel layer extends from the bonding surface to the top surface;
providing a seal layer comprising a seal surface and an outer surface opposite from the seal surface; and
forming a sealed cavity in a layer of the multilayer test pack other than the channel lamina; and
disposing the sterilization indicator in the sealed cavity.

16. The method of claim 15, wherein the recessed channel extends from an inlet port exposed to an external environment to an outlet port exposed to the sealed cavity.

17. The method of claim 15, wherein bonding the seal surface to the bonding surface comprises thermal bonding or adhesive bonding.

18. The method of claim 15, wherein the channel lamina comprises a single, unitary structure, and wherein the method further comprises microreplicating the recessed channel into the channel layer.

19. The method of claim 15, wherein the channel lamina comprises a first continuous layer comprising the channel layer and a second continuous layer comprising the surface layer, and wherein the method further comprises bonding the first continuous layer to the second continuous layer.

20. The method of claim 15, wherein the channel lamina is provided on a first roll and the seal layer is provided on a second roll, the method further comprising:
unrolling the channel lamina;
unrolling the seal layer; and
continuously bonding the seal surface to the bonding surface.

* * * * *